Feb. 2, 1960  B. W. LEAKE  2,923,896
DUPLEXERS
Filed July 2, 1956  2 Sheets-Sheet 1
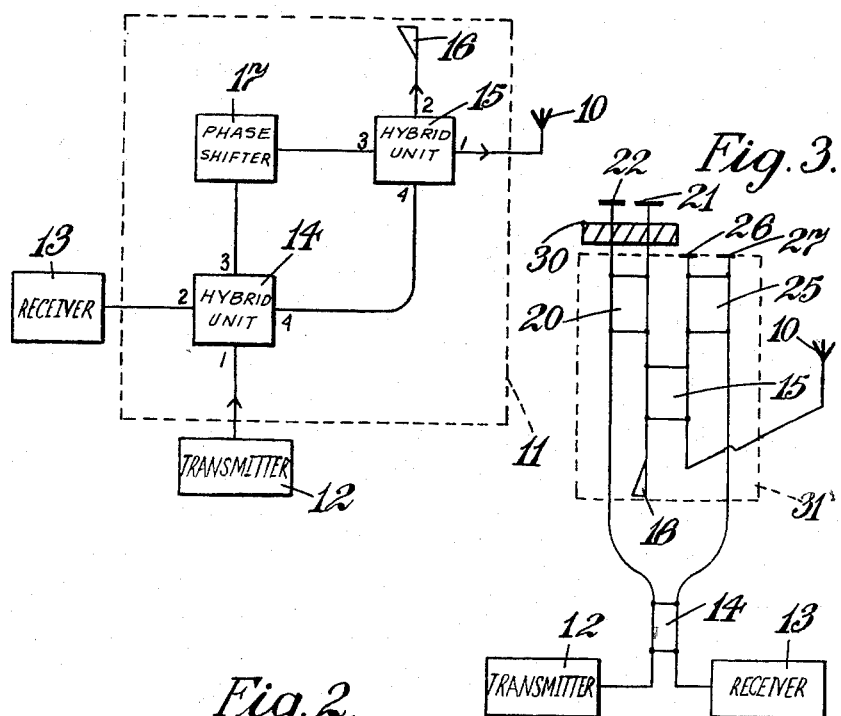
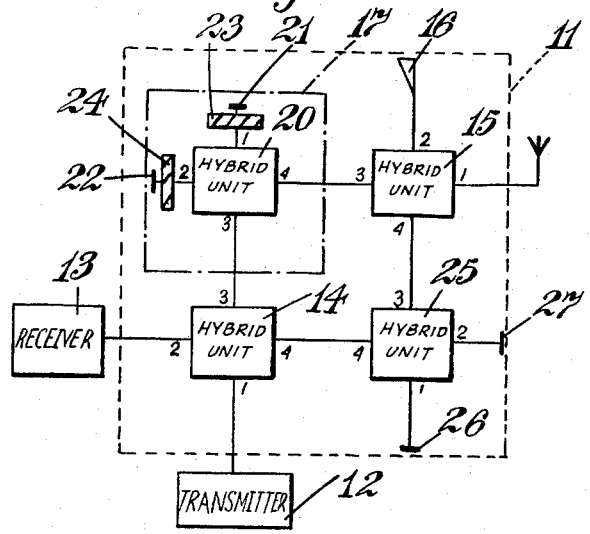

2,923,896
DUPLEXERS

Bernard William Leake, London, England, assignor to The Decca Record Company Limited, London, England, a British company Application July 2, 1956, Serial No. 595,424

Claims priority, application Great Britain July 5, 1955

9 Claims. (Cl. 333—13)

This invention relates to duplexers for connecting an antenna alternatively to either a transmitter or receiver according to whether signals are to be transmitted or received.

The present invention makes use of hybrid units such as, for example, magic T's, rat-races or 3 db directional couplers. Such hybrid units have two pairs of decoupled arms and, if a signal is fed into any one arm, it will not pass into the decoupled arm but will be divided equally between the two remaining arms. In the following description one pair of decoupled arms will be referred to as the first and second arms and the other pair of decoupled arms as the third and fourth arms.

According to this invention, a duplexer comprises a pair of hybrid units, one of which has its third and fourth arms connected respectively to the third and fourth arms of the second hybrid unit and phase shift means in one or both of the connections between the hybrid units for altering the difference in the electrical lengths of the two connections by a half wavelength at the operating frequency according to the direction of transmission of the signals, the lengths of these connections being such that, by this alteration, the first arm of one hybrid unit may be switched from being effectively coupled to the first arm of the second hybrid unit and decoupled from the second arm of the second hybrid unit to being effectively coupled to the second arm of the second hybrid unit and decoupled from the first arm of the second hybrid unit. The phase shift means may comprise, for example, in one of the connections, a gyrator (i.e. a device, the electrical length of which differs by one half wave length for propagation in opposite directions) in which case the duplexer may be used for either pulse radar or for continuous wave systems such as two-way microwave links or frequency-modulated radar. In the case, however, of pulse radar, the phase shift means may be a phase shifter which can be switched in synchronism with the pulses produced by the transmitter. Using this arrangement in pulse radar apparatus, if the antenna is connected to the first arm of the second hybrid unit, and if the switching is effected in synchronism with the pulses produced by the radar transmitter, the radar receiver may be connected to the first arm of the first hybrid unit and the transmitter to the second arm of that hybrid unit.

With the duplexer of the present invention, both the hybrid units operate with the full power and there are no standing waves. However, there are two connections between the two hybrid units so that the phase shift means only operates under half power. Since the phase shift means only operates under half power, the problem of designing a phase shifter for use with high-power pulse radar sets is greatly eased. If the arm of the second hybrid unit which is decoupled from the arm connected to the antenna is provided with a dummy matched load, any power from the transmitter before the appropriate switching is effected would be fed into the dummy load and not into the receiver. Furthermore, the receiver is permanently decoupled from the transmitter by the back coupling of a hybrid unit, and hence a T.R. cell on the front of the receiver would have only very low incident power. Such low incident power ensures that the cell has a short recovery time or alternatively the "capture gas" is not required in the cell which therefore may have a longer life.

According to a further aspect of the invention, a duplexer for microwave radar apparatus having a common antenna for radiating signals from a transmitter and for feeding signals to a receiver comprises a pair of hybrid units, one of which units has its first arm arranged to be fed from the transmitter, the second arm arranged to feed the receiver and its third and fourth arms connected respectively to the third and fourth arms of the second hybrid unit, of which second unit either the first or second arm is arranged to be connected to the antenna, and phase shift means in one or both of the connections between the two hybrid units for altering the difference in the effective lengths of the two connections by a half wave-length in accordance with the direction of transmission of the signals in such manner that the signals from the transmitter are fed through the two connections between the hybrid units to the antenna and so that signals received at the antenna are fed to the receiver.

In the case of a pulse radar, the phase shift means would be arranged to alter the difference in the effective lengths of the two connections by a half wavelength in synchronism with the transmitter pulses in such manner that, when the transmitter generates a pulse, this pulse is fed through the two connections between the hybrid units to the antenna and so that, in the intervals between the transmitter pulses, signals received at the antenna are fed to the receiver. Conveniently, the phase shift means are arranged to be operated by the transmitter pulses.

In one construction of duplexer for a pulse radar, one of the connections between the first and second hybrid units may be effected by connecting the third arms of each of these two hybrid units respectively to two decoupled arms of a third hybrid unit. The other two decoupled arms of the third hybrid unit are each terminated by a fixed short circuit at suitable relative distances along the two arms so that no reflection is produced by the third hybrid unit and gas cells are provided approximately a quarter wavelength in front of the fixed short circuits so that an effective change of a half wavelength in one connection between the first and second hybrid units is made by firing the gas cells. Instead of having separate gas cells in each arm, a single gas cell may be arranged to extend across both the short circuited arms of the third hybrid unit. The gas cell or each gas cell may comprise a power-sensitive tube, such as an argon filled tube, adapted to fire under the power of the incident pulse from the transmitter. Alternatively, the gas cell or each gas cell may comprise a device which can be pulsed concurrently with the transmitter pulses.

It may be advantageous, from the point of view of bandwidth, to make the device symmetrical and, for that reason, the connection between the fourth arms of the first and second hybrid units may comprise a fourth hybrid unit having one pair of its decoupled arms connected to the fourth arms of each of the first and second hybrid units and having fixed short circuits in the other two decoupled arms at relative distances such as to provide a matched connection between the first and second hybrid units.

It is particularly convenient to use 3 db branched guide directional couplers in this form of duplexer since four such directional couplers may be readily constructed by milling operations on two blocks of metal which are subsequently placed together with the mating faces of the waveguides parallel to the lines of current flow so that radiation does not occur.

The following is a description of one embodiment of the invention, reference being made to the accompanying drawings in which:

Figure 1 is a block diagram illustrating a duplexer;

Figure 2 is a diagram similar to Figure 1, but showing in further detail a form of duplexer more particularly adapted for pulse radar apparatus;

Figure 3 illustrates a layout for the duplexer of Figure 2 when using branched-guide directional couplers.

Figure 4:
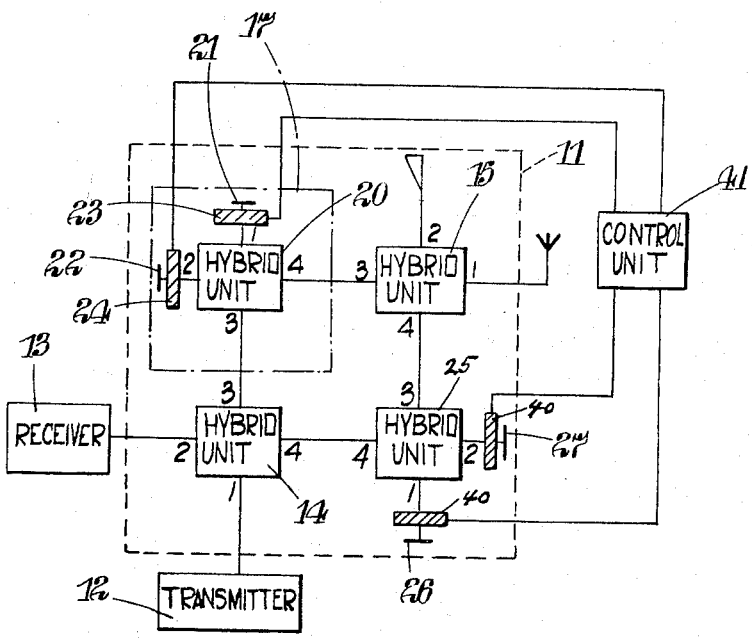
Figure 4 illustrates a modification of the arrangement of Figure 2.

Referring to Figure 1 there is illustrated diagrammatically radar apparatus comprising an antenna 10 which may be coupled by means of a duplexer 11 either to a transmitter 12 so that the antenna can radiate signals from the transmitter or to a receiver 13 for receiving signals picked up by the antenna 10. The duplexer 11 includes a pair of hybrid units 14, 15. In each of these hybrid units the four arms are numbered 1, 2, 3 and 4, these being respectively the first, second, third and fourth arms referred to above so that in each case arms 1 and 2 are decoupled and arms 3 and 4 are decoupled. Hence an input at, for example, arm 1, will give equal outputs from arms 3 and 4, but no output from arm 2.

As shown in Figure 1, the transmitter 12 and receiver 13 are coupled respectively to arms 1 and 2 of hybrid unit 14 so that, provided the first and second arms of hybrid unit 14 are terminated in matched loads, the receiver and transmitter are always decoupled from one another. The antenna 10 is connected to arm 1 of hybrid unit 15 and a matched load 16 is connected to arm 2 of that hybrid unit. The arms 3 of each of the hybrid units are connected to one another through a phase shifter 17 and the arms 4 of the two hybrid units are directly connected to one another. It will be seen that, dependent on the relative lengths of the two connections between the two hybrid units 14, 15, the antenna 10 may be coupled either to the transmitter 13 or to the receiver 12, the change in the difference in length for the two conditions being one half wavelength. The phase shifter 17 is arranged so that the difference in effective length of the two connections can be altered by half a wavelength according to the required direction of transmission of signals through the duplexer. When the antenna 10 is connected to the transmitter 12, the receiver 13 is connected to the matched load 16 and vice versa. For a continuous wave system, such as for example a microwave communication link or a continuous wave type of radar apparatus, the phase shifter 17 may comprise a gyrator, that is to say a device, the electric length of which differs by one-half wavelength for propagation in opposite directions.

It will be appreciated that instead of using a single phase shifter in the connection between the third arms of the first and second hybrid unit, two separate phase shifters may be used, one in the connection between the third arms and one in connection between the fourth arms and such arrangement would have the advantage of being symmetrical although it would necessitate the simultaneous operation of the two phase shifters. Such a duplexer is described later with reference to Figure 4.

There is shown in further detail in Figure 2 one particular way in which the duplexer of Figure 1 may be arranged for use with pulse radar apparatus. Corresponding components in Figures 1 and 2 are denoted by the same reference numerals and in the following description, mention will only be made of the difference between the two figures. In Figure 2, the phase shifter 17 in the connection between the third arms of the hybrid units 14 and 15 includes a further hybrid unit 20. The third arm of the hybrid unit 14 is connected to the third arm of the hybrid unit 20 and the third arm of hybrid unit 15 is connected to the fourth arm of the third hybrid unit 20. The first and second arms of the third hybrid unit 20 are terminated by fixed short circuits 21 and 22 respectively and gas tubes 23, 24 are arranged respectively in these two arms a quarter wavelength in front of the short circuits. Most conveniently the first and second arms of hybrid unit 20 are arranged to be physically close together, so that a single gas tube can be arranged to extend across both arms so as to avoid the necessity of having two separate gas tubes 23 and 24 as shown in the figure. To make the duplexer symmetrical, the fourth arms of the hybrid units 14, 15 are connected respectively to the fourth and third arms of a fourth hybrid unit 25. The first and second arms of this fourth hybrid unit are terminated respectively by fixed short circuits 26 and 27.

When the transmitter 12 in the arrangement shown in Figure 2 produces a pulse, this will cause the gas tubes 23 and 24 to fire and hence will change the effective positions of the short circuits in the first and second arms of the hybrid unit 20, and so change the electrical length of the connection between the third arms of the hybrid units 14 and 15 by half a wavelength compared with the receive condition between transmitter pulses. It will thus be seen that this arrangement operates in the manner which has been described above with reference to Figure 1.

It is particularly convenient to use 3 db branched-guide directional couplers for the hybrid units since this facilitates the construction and lay-out of the duplexer. Figure 3 illustrates a lay-out for the duplexer of Figure 2 when using such branched-guide directional couplers and will be self explanatory since the same reference numerals are used to indicate corresponding components. A single gas tube 30 however is shown in Figure 3 in place of the separate tubes 23, 24. In the arrangement of Figure 3, the whole duplexer circuit may be conveniently formed and more especially the assembly 31 comprising the three hybrid units 15, 20 and 25 may conveniently be formed by milling operations on two blocks of metal which are subsequently placed together with the mating faces of the waveguides parallel to the lines of current flow so that radiation does not occur.

Figure 4 illustrates a modification of the arrangement of Figure 2 in which each of the hybrid units 20 and 25 is arranged to act as a phase shifter. The same reference numerals are used in Figure 4 as are used for Figure 2 and illustrate corresponding components and in the following description mention will only be made of the distinction between the two figures. In Figure 4 gas cells 40 are inserted in the first and second arms of the hybrid unit 25 in front of the short circuits 26, 27 and these gas cells together with the gas cells 23, 24 are controlled by a control unit 41 so as to change the difference of the electrical lengths between the connection between the third arms of the hybrid units 14, 15 and the connection between the fourth arms of the hybrid units 14, 15 by a half wavelength.

I claim:

1. In microwave radar apparatus having a common antenna for radiating pulse signals from a transmitter and for feeding signals to a receiver, a duplexer comprising first, second and third hybrid units, each having first, second, third and fourth arms of which the first and second arms are decoupled from one another and the third and fourth arms are decoupled from one another, said first hybrid unit having its first arm connected to the transmitter and its second arm connected to the receiver and said second hybrid unit having its first arm connected to the antenna and its second arm to a dummy matched load, means connecting the fourth arm of said first hybrid unit to the fourth arm of the second hybrid unit, means connecting the third and fourth arms of said third hybrid unit to the third arms of said first and second hybrid units respectively, fixed short-circuits terminating the first and second arms of said third hybrid unit and switchable short-circuit means in the first and second arms of said third hybrid unit a quarterwavelength at the operating frequency in front of the fixed short circuits for altering the effective length of the connection between the fourth arms of said first and second hybrid units so that, by this alteration, the antenna may be switched from be'ng coupled to the transmitter and decoupled from the receiver to being coupled to the receiver and decoupled from the transmitter.

2. A duplexer as claimed in claim 1 wherein said switchable short-circuit means comprises gas discharge means adapted to fire under the power of the pulses from the transmitter.

3. A duplexer as claimed in cla'm 2 wherein said gas discharge means comprise a separate gas cell in each of said first and second arms of said third hybrid unit.

4. A duplexer as claimed in claim 2 wherein said gas discharge means comprise a single gas cell arranged to extend across both said first and sa'd second arms of said third hybrid unit.

5. A duplexer as claimed in claim 1 wherein the means connecting the fourth arm of the first hybrid unit to the fourth arm of the second hybrid unit comprises a fourth hybrid unit having first, second, third and fourth arms of which the first and second arms are decoupled from one another and the third and fourth arms are decoupled from one another, the third and fourth arms of said fourth hybrid unit being connected to the fourth arms of said first and said second hybrid units respectively and the first and second arms of said fourth hybrid unit being terminated in fixed short-circuits.

6. A duplexer as cla'med in claim 5 wherein each of said hybrid units comprises a 3 db directional coupler.

7. A duplexer comprising first, second, third and fourth hybrid units each having first, second, third and fourth arms of which the first and second arms are decoupled from one another and the third and fourth arms are decoupled from one another, the third arms of the first and second hybrid units being connected respect'vely to the third and fourth arms of the third hybrid unit and the fourth arms of the first and second hybrid units being connected respectively to the fourth and third arms of the fourth hybrid unit, and short circuits across the first and second arms of the third and fourth hybrid units, the short-c'rcuits across the two arms of at least one of said third and fourth hybrid units being adjustable in position to change the difference in effective electrical lengths of the connection between the third arms of the first and second hybrid units and the connection between the fourth arms of the first and second hybrid un'ts whereby the first arm of the first hybrid unit may be switched from being coupled to the first arm of the second hybrid unit and decoupled from the second arm of the second hybrid unit to being coupled to the second arm of the second hybrid unit and decoupled from the first arm of the second hybrid unit.

8. A duplexer comprising first, second, third and fourth hybrid units each having first, second, third and fourth arms of which the first and second arms are decoupled from one another and the third and fourth arms are decoupled from one another, the third arms of the first and second hybrid units being connected respectively to the third and fourth arms of the third hybrid unit and the fourth arms of the first and second hybrid units being connected respectively to the fourth and third arms of the fourth hybrid unit, fixed short-circuits across the first and second arms of the third and fourth hybrid units and gas discharge means forming controllable short-circuits across the first and second arms of the third hybrid unit in front of the fixed short-circuits in those arms to change the difference in effective electrical lengths of the connection between the third arms of the first and second hybrid units and the connection between the fourth arms of the first and second hybrid units whereby the first arm of the first hybrid unit may be switched from being coupled to the first arm of the second hybrid unit and decoupled from the second arm of the second hybrid unit to being coupled to the second arm of the second hybrid unit and decoupled from the first arm of the second hybrid unit.

9. A duplexer comprising first, second, third and fourth hybrid units each having first, second, third and fourth arms of which the first and second arms are decoupled from one another and the third and fourth arms are decoupled from one another, the third arms of the first and second hybrid units being connected respectively to the third and fourth arms of the third hybrid unit and the fourth arms of the first and second hybrid units being connected respectively to the fourth and third arms of the fourth hybrid unit, fixed short-circuits across the first and second arms of the third and fourth hybrid units and gas discharge means forming controllable short-circuits across the first and second arms of the third and fourth hybrid units in front of the fixed short-circuits in those arms to change the difference in effective electrical lengths of the connection between the third arms of the first and second hybrid units and the connection between the fourth arms of the first and second hybrid units whereby the first arm of the first hybrid unit may be switched from being coupled to the first arm of the second hybrid unit and decoupled from the second arm of the second hybrid unit to being coupled to the second arm of the second hybrid unit and decoupled from the first arm of the second hybrid unit.

References Cited in the file of this patent

UNITED STATES PATENTS

| | | |
|---|---|---|
| 2,704,351 | Dicke | Mar. 15, 1955 |
| 2,748,353 | Hogan | May 29, 1956 |
| 2,762,871 | Dicke | Sept. 11, 1956 |
| 2,849,685 | Weiss | Aug. 26, 1958 |
| 2,850,626 | Tomiyasu | Sept. 2, 1958 |